US009478814B2

(12) United States Patent
Åström (10) Patent No.: US 9,478,814 B2
(45) Date of Patent: Oct. 25, 2016

(54) METHOD AND ARRANGEMENT TO CONTROL OPERATING CONDITIONS IN FUEL CELL DEVICE

(71) Applicant: Convion Oy, Espoo (FI)

(72) Inventor: Kim Åström, Kirkkonummi (FI)

(73) Assignee: CONVION OY, Espoo (FI)

( * ) Notice: Subject to any disclaimer, the term of this patent is extended or adjusted under 35 U.S.C. 154(b) by 6 days.

(21) Appl. No.: 13/776,032

(22) Filed: Feb. 25, 2013

(65) Prior Publication Data

US 2013/0171533 A1 Jul. 4, 2013

Related U.S. Application Data (63) Continuation of application No. PCT/FI2011/050621, filed on Jun. 30, 2011.

(30) Foreign Application Priority Data

Aug. 25, 2010 (FI) ..................... 20105883

(51) Int. Cl.
H01M 8/04 (2016.01)
H01M 8/24 (2016.01)
H01M 8/12 (2016.01)

(52) U.S. Cl.
CPC ..... H01M 8/04037 (2013.01); H01M 8/04335 (2013.01); H01M 8/04365 (2013.01);
(Continued)

(58) Field of Classification Search
None
See application file for complete search history.

(56) References Cited

U.S. PATENT DOCUMENTS

2002/0068204 A1* 6/2002 Iio ........................ C01B 3/583
429/412

2002/0109410 A1* 8/2002 Young ....................... H02J 3/32
307/64
(Continued)

FOREIGN PATENT DOCUMENTS

EP 2 169 753 A1 3/2010
JP 59-141173 A 8/1984
(Continued)

OTHER PUBLICATIONS

Office Action (Decisioon of Final Rejection) issued on Dec. 4, 2013, by the Japanese Patent Office in corresponding Japanese Patent Application No. 2013-525330, and an English Translation of the Office Action. (10 pages).
(Continued)

Primary Examiner — Gregg Cantelmo
(74) Attorney, Agent, or Firm — Buchanan Ingersoll & Rooney PC (57) ABSTRACT

An exemplary arrangement and method for controlling operating conditions of a fuel cell device are disclosed. The fuel cell device having plural fuel cells, each including an anode side, a cathode side, an electrolyte between the anode side and the cathode side, and being arranted in a stack. The control arrangement includes at least one controllable electrical heater configured to produce controllable heat quantities, at least two controllers that control fuel cell quantities including at least a portion of air flowing to the fuel cells and heat applied to the stack environment. The controllable heat quantities and controllable fuel cell quantities are controlled to meet a target value. The fuel cell device includes a low level high speed controller configured to control at least one controllable electrical heater to operate the heater as a buffer for excess energy of the fuel cell device.

6 Claims, 3 Drawing Sheets

(52) U.S. Cl.
CPC ..... *H01M8/04395* (2013.01); *H01M 8/04589* (2013.01); *H01M 8/04708* (2013.01); *H01M 8/04738* (2013.01); *H01M 8/04753* (2013.01); *H01M 8/04917* (2013.01); *H01M 8/04947* (2013.01); *H01M 2008/1293* (2013.01); *Y02E 60/50* (2013.01); *Y02E 60/525* (2013.01)

(56) References Cited

U.S. PATENT DOCUMENTS

| | | | |
|---|---|---|---|
| 2002/0114985 A1* | 8/2002 | Shkolnik et al. | 429/20 |
| 2002/0167227 A1* | 11/2002 | Matsunaga et al. | 307/117 |
| 2003/0194587 A1* | 10/2003 | Fagley | H01M 8/04007 429/423 |
| 2004/0096713 A1* | 5/2004 | Ballantine et al. | 429/23 |
| 2004/0129835 A1* | 7/2004 | Atkey et al. | 244/118.5 |
| 2004/0197610 A1* | 10/2004 | Drunert | 429/13 |
| 2009/0075124 A1 | 3/2009 | Vesely et al. | |
| 2009/0084771 A1* | 4/2009 | Nomura | 219/263 |

FOREIGN PATENT DOCUMENTS

| | | | |
|---|---|---|---|
| JP | 2001068125 A * | 3/2001 | |
| JP | 2003-229154 A | 8/2003 | |
| JP | 2004-103287 A | 4/2004 | |
| JP | 2006050838 A * | 2/2006 | |
| JP | 2006071216 A * | 3/2006 | |
| JP | 2007-265778 A | 10/2007 | |
| JP | 2008-152997 A | 7/2008 | |
| JP | 2009-181852 A | 8/2009 | |
| JP | 2009-272158 A | 11/2009 | |
| JP | 2010-15797 A | 1/2010 | |
| JP | 2010067616 A * | 3/2010 | |
| JP | 2010-165640 A | 7/2010 | |
| WO | WO 8906866 A * | 7/1989 | |
| WO | WO 2009058111 A1 * | 5/2009 | |
| WO | WO 2009063283 A2 * | 5/2009 | |

OTHER PUBLICATIONS

International Search Report (PCT/ISA/210) issued on Dec. 5, 2011, by the Finnish Patent Office as the International Searching Authority for International Application No. PCT/FI2011/050621.

Finnish Search Report dated Apr. 29, 2011.

International Preliminary Report on Patentability (PCT/IPEA/409) issued on Jun. 25, 2012, by the Finnish Patent Office as the International Searching Authority for International Application No. PCT/FI2011/050621.

Office Action issued in corresponding Japanese Patent Application No. 2014-079998 on Feb. 24, 2015.

Office Action issued on Aug. 13, 2013, by the Japanese Patent Office in corresponding Japanese Patent Application No. 2013-525330. (4 pages).

* cited by examiner

METHOD AND ARRANGEMENT TO CONTROL OPERATING CONDITIONS IN FUEL CELL DEVICE

RELATED APPLICATION(S)

This application claims priority under 35 U.S.C. §120 to PCT/FI2011/050621, filed on Jun. 30, 2011 designating the U.S., and claiming priority to Finnish Application 20105883 filed in Finland on Aug. 25, 2010, the contents of which are hereby incorporated by reference in their entireties.

FIELD

The disclosure relates to fuel cell devices in general and particularly to controlling operating conditions in a fuel cell device.

BACKGROUND INFORMATION

Fuel cell devices are becoming general in fulfilling different kind of electricity production needs. Fuel cell devices are electrochemical devices supplied with reactants for producing electrical energy, which enable production of electricity with a high duty ratio in an environmentally friendly process. Fuel cell technology is considered as one of the most promising future energy production methods.

Figure 1:
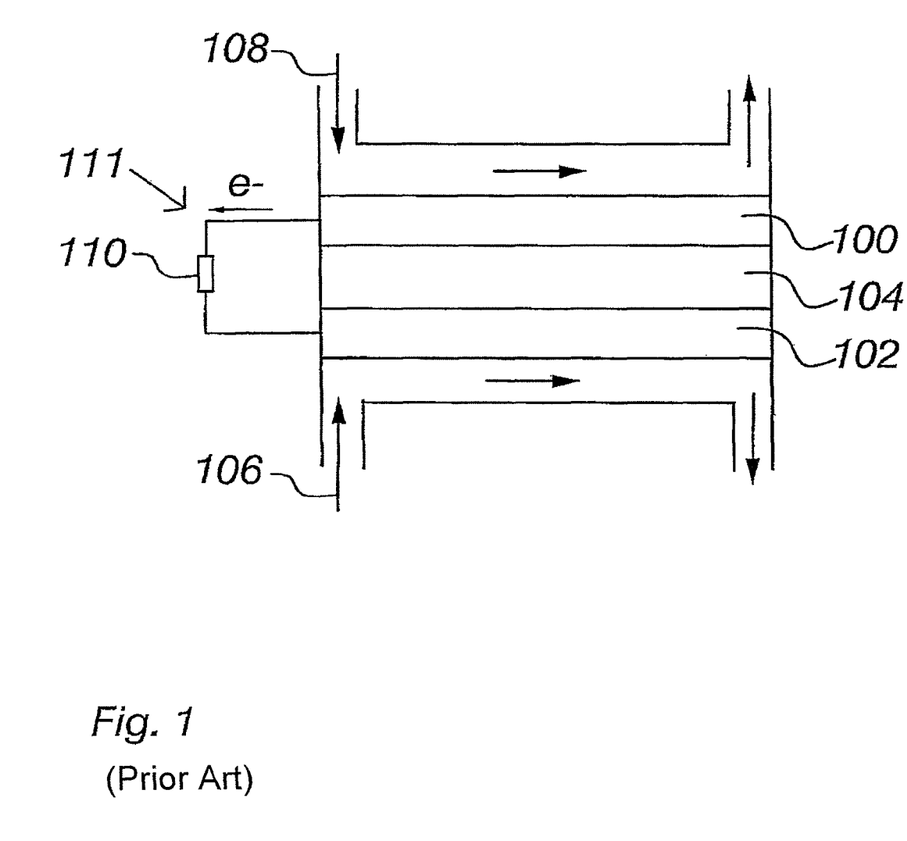
FIG. 1 illustrates a single fuel cell structure in accordance with a known implementation.

FIG. 1 illustrates an exemplary fuel cell in accordance with a known implementation. As shown in FIG. 1, the fuel cell includes an anode side 100 and a cathode side 102 and an electrolyte material 104 between them. The reactants fed to the fuel cell devices undergo a process in which electrical energy and heat are produced as a result of an exothermal reaction.

In known solid oxide fuel cells (SOFCs) oxygen 106 is fed to the cathode side 102 and it is reduced to a negative oxygen ion by receiving electrons from the cathode. The negative oxygen ion goes through the electrolyte material 104 to the anode side 100 where it reacts with the used fuel 108 producing water and carbon dioxide ($CO_2$). Between the anode and the cathode is an external electric circuit 111 for transferring electrons e– to the cathode. The external electric circuit 111 includes a load 110.

Figure 2:
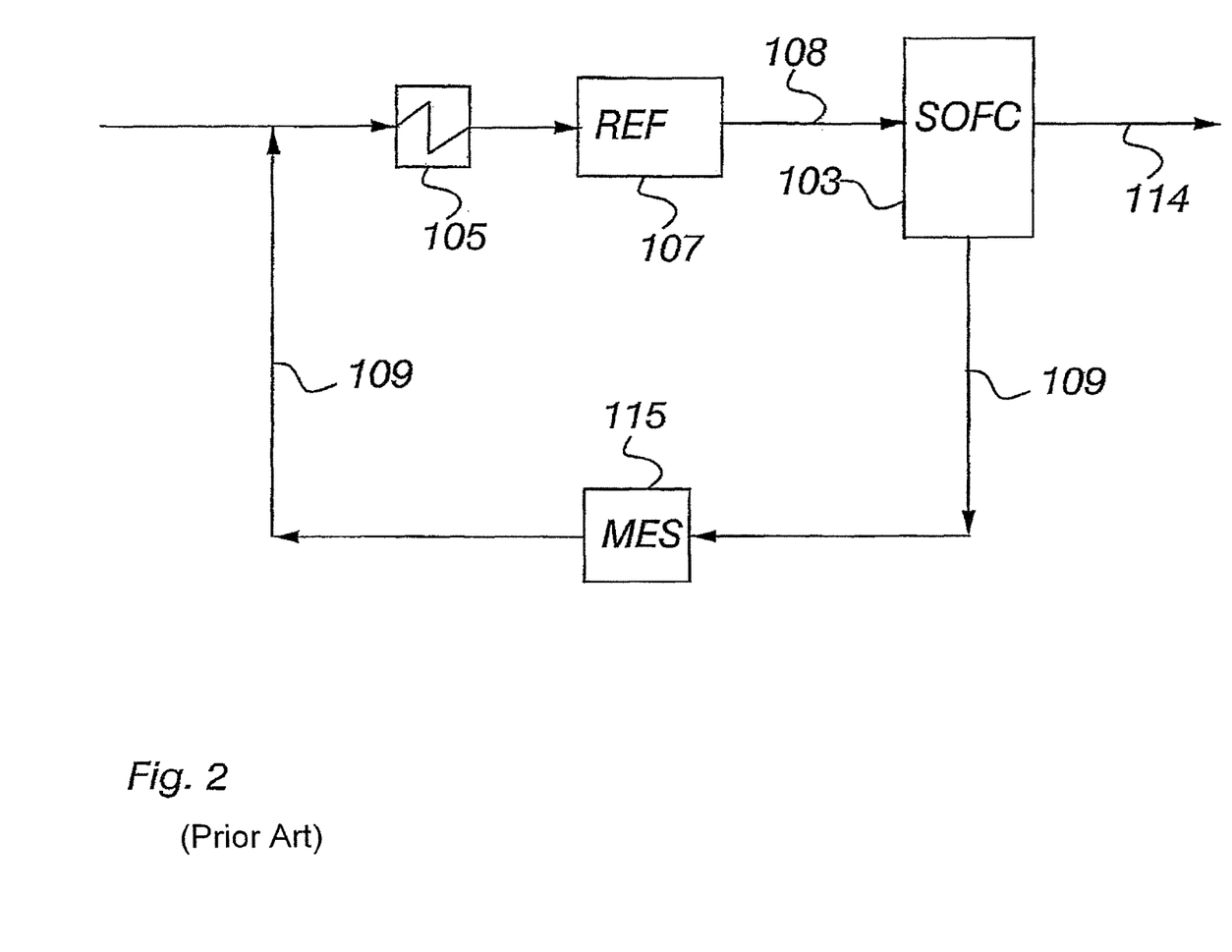
FIG. 2 illustrates an exemplary fuel cell device in accordance with a known implementation.

FIG. 2 illustrates an exemplary SOFC device in accordance with another known implementation. As shown in FIG. 2, the SOFC device can utilize as fuel, for example, natural gas, bio gas, methanol or other compounds containing hydrocarbons. The SOFC device in FIG. 2 includes planar-like fuel cells in stack formation 103 (SOFC stack). Each fuel cell includes an anode 100 and a cathode 102 as presented in FIG. 1. A portion of the used fuel is recirculated in feedback arrangement 109 through each anode.

The SOFC device of FIG. 2 includes a fuel heat exchanger 105 and a reformer 107. Heat exchangers 105 are used for controlling thermal conditions in fuel cell process and therefore, more than one can be located in different locations of the SOFC device. The extra thermal energy in circulating gas can be recovered in the heat exchanger 105 to be utilized in the SOFC device or outside in a heat recovering unit. The heat recovering heat exchanger can thus be located in different locations as shown in FIG. 2. The reformer is a device that converts the fuel, for example, natural gas, to a composition suitable for fuel cells, to a composition containing, for example, half hydrogen and other half methane, carbon dioxide, and inert gases. The reformer is not, however, necessary in all fuel cell implementations, but untreated fuel can also be fed directly to the fuel cells 103.

By using measurement means 115 (such as a fuel flow meter, current meter, temperature meter or any other suitable meter as desired) measurements of the anode recirculating gas can be carried out for the operation of the SOFC device. A portion (e.g., part) of the gas used at anodes 100 (FIG. 1) of the fuel cells 103 is recirculated through anodes in feedback arrangement 109 and thus in FIG. 2 is presented diagrammatically also as the other part of the gas is exhausted 114 from the anodes 100.

Known fuel cell devices produce electrical energy in the form of direct current having a low voltage level. The voltage level can be raised by combining several fuel cells or combinations of fuel cells to form a serial connection such as for example a stacked formation. Current-voltage characteristics of the fuel cells depend on for example reactant compositions, mass flow, temperature and pressure. Electrochemical reactions in the fuel cell can react quickly to fluctuations in the fuel cell load. However, the response capacity of reactants input system can be slower, such as response times of seconds or even minutes. When trying to obtain more efficiency out of fuel cells than the prevailing input of reactants allows, a weakening of fuel cell voltages can result, and even an irreversible deterioration of fuel cells is possible. In addition, load changes can cause rapid temperature changes in the fuel cell, which in high temperature fuel cells can cause harmful thermomechanical stress, resulting in significant reduction of performance and life time of fuel cells. Thus, fuel cell systems should be designed so that the load of each fuel cell is kept as constant as possible and a possible change in the load is tried to be carried out as controllable as possible.

When the fuel cells are used to obtain independent variable AC loads, or to supply power to a distribution network, a DC-AC converter can be used to convert DC power to AC power. There can also be a need for DC-DC converters to raise DC voltage obtained from the fuel cells to a level that is suitable for DC-AC converter. However, due to the highly limited compatibility and capacity of the fuel cells to respond to changes in load, known fuel cell implementations, such as high temperature fuel cell implementations, apply badly as power sources to feed independent variable AC loads or to feed variable power to the distribution network. A known way to try to fix said problem is the use of an energy buffer, which consists, for example, of lead acid batteries. The function of the energy buffer is to feed or consume power in rapidly changing conditions so that the load variation of the fuel cell can be controlled. In large fuel cell systems, for example, disadvantages of known implementations become more serious due to high cost, large size, heavy weight, and limited effectiveness. In electrical network coupled applications, another known implementation can maintain a constant fuel cell load for a current controlled transform in feeding power to the network. The control based on current controlled transform may not be suitable in a network independent operation, and thus it cannot be used as an emergency power source for critical AC loads inside or outside the fuel cell system.

High temperature fuel cell systems can specify a major heat energy amount for heating systems up to operating temperatures. From this follows that start-up times can be up to tens of hours in length. Wide temperature alternations in shut down and start up sequences expose the fuel cells and related system components to even excessive thermomechanical stress. Thus, the high-temperature fuel cell systems must be designed to operate continuously for as long time periods as possible, for even thousands of hours, without any shut downs. To achieve this objective the system should be designed to fulfil high reliability as well as to minimize such external factors, which might shut down the system or might drive the system to harmful operation conditions. Current controlled converters have faced issues in fuel cell applications as they are unable to protect the fuel cells from sudden changes in load, arising from different network disruptions such as power failures, voltage dips, or transients.

Heat management of the fuel cell stacks is one of the key functions of the balance of plant (BoP) equipment in a high temperature fuel cell system. The heat balance of the fuel cell stacks is affected by many mechanisms including internal reforming, fuel cell reactions, heat transport by flow of reactants and direct heat exchange with the surrounding structures. Exemplary methods for the control of the temperature balance include adjustment of the internal reforming rate and adjustment of air flow and cathode inlet temperature. The temperature control of stacks involves the temperature control of a significant amount of thermal mass in the stacks and related structures, hence introducing long response times to changes in operating parameters. These long response times, along with similar long response times in other parts of the BoP control limit the capability of the fuel cell system to respond to rapid load changes.

In known systems designed for stand-alone operation, power balance of the system should be controlled to match the demand (load) at every time instant. Due to the long response times in stack and BoP control, high temperature fuel cell processes can be inherently poorly suited for applications specifying rapid changes in stack power output. To overcome this obstacle, fuel cell systems having to respond to load changes can be equipped with massive energy storages and/or auxiliary energy dumping mechanisms to reduce the rate of change of operating conditions. In grid-tied systems designed for steady state operation, the inclusion of such equipment to be used only in case of grid failures (fault ride through capability) can be unbeneficial in terms of added value with respect to added cost, weight and system complexity.

SUMMARY

A control arrangement for controlling operating conditions of a fuel cell device that produces electricity with fuel cells is disclosed, each fuel cell in the fuel cell device having an anode side, a cathode side, and an electrolyte between the anode side and the cathode side; the fuel cells are arranged to be in stack formation, and the fuel cell device includes a load for the fuel cells, a controller for said load for fuel cells, and means for determining temperature information of the fuel cells, the fuel cell device being configured to be parallel connected to an electrical network for providing electrical current to the electrical network, the control arrangement comprising: at least one controllable electrical heater configured to produce controllable heat quantities both in normal operation conditions and in power imbalance situations; at least two controllers that control as controllable fuel cell quantities, at least a portion of air flowing to the fuel cells and heat applied to the stack environment, wherein at least one of the controllable heat quantities and controllable fuel cell quantities are controlled to meet a target value; and a low level high speed controller configured to control said at least one controllable electrical heater during a power imbalance by deriving the heater power based on a power balance of the fuel cell device to operate said heater as a buffer for excess energy of the fuel cell device.

An exemplary control method for controlling operating conditions of a fuel cell device having fuel cells arranged in a stack for producing electricity is disclosed, the method comprising: controlling a load of the fuel cells by determining temperature information of the fuel cells and by arranging the fuel cell device to be parallel connected to an electrical network to provide electrical current to the network; producing controllable heat quantities under normal operation conditions and power imbalance conditions through at least one controllable electrical heater; controlling the controllable heat quantities and controllable fuel cell quantities, which include at least a portion of air flow to the fuel cells and heat applied to the stack of fuel cells to meet a target value; and during a power imbalance controlling said at least one controllable electrical heater by deriving heater power based on a power balance of the fuel cell device to operate said heater as a buffer for excess energy of the fuel cell device.

An exemplary non-transitory computer readable medium having a program recorded thereon for executing a method for controlling operating conditions of a fuel cell device having fuel cells arranged in a stack for producing electricity is disclosed, which when the computer readable medium is in communicable contact with a processor causes the processor to execute the method comprising: controlling a load of the fuel cells by determining temperature information of the fuel cells and by arranging the fuel cell device to be parallel connected to an electrical network and configured to produce electrical current; producing controllable heat quantities under normal operation conditions and power imbalance conditions through at least one controllable electrical heater; controlling the controllable heat quantities and controllable fuel cell quantities, which include at least a portion of air flow to the fuel cells and heat applied to the stack of fuel cells to meet a target value; and during a power imbalance controlling said at least one controllable electrical heater by deriving heater power based on a power balance of the fuel cell device to operate said heater as a buffer for excess energy of the fuel cell device.

DETAILED DESCRIPTION

Exemplary embodiments of the disclosure are directed to a control arrangement (e.g., system) for a fuel cell device, in which the control arrangement provides reliable and advanced operation modes of the fuel cell device in relation to exceptional operating conditions, such as, for example, power failures in electrical networks. This is achieved by a control arrangement (e.g., system) for controlling operating conditions of a fuel cell device, which produces electricity with fuel cells, each fuel cell in the fuel cell device having an anode side, a cathode side, an electrolyte between the anode side and the cathode side, and the fuel cells all arranged in a stack formation. The fuel cell device includes load for fuel cells, a controller for said load for fuel cells, and means for determining essential temperature information of the fuel cells, the fuel cell device being arranged to be parallel connected to electrical network for producing electrical current to electrical network. The control arrangement includes (e.g., comprises) at least one controllable electrical heater for operating as a device producing heat quantities as controllable heat quantities both in normal operation conditions and in power imbalance situations, at least two controllers for controlling as controllable fuel cell quantities at least amount of air flow to the fuel cells and heat applied to the stack environment for controlling at least one of the controllable heat quantities and controllable fuel cell quantities essentially to a target value, and a low level high speed controller for controlling in power imbalance situation said at least one controllable electrical heater to operate said heater as a buffer for excess energy of the fuel cell device.

Exemplary embodiment of the disclosure are also directed to a control method for controlling operating conditions of a fuel cell device, which produces electricity with fuel cells, by controlling in the method load for the fuel cells, by determining essential temperature information of the fuel cells, and by arranging the fuel cell device to be parallel connected to electrical network for producing electrical current to electrical network. In the method is arranged at least one controllable electrical heater to operate as a device producing heat quantities as controllable heat quantities both in normal operation conditions and in power imbalance situations, as controllable fuel cell quantities are controlled by at least an amount of air flow to the fuel cells and heat applied to the stack environment for controlling at least one of the controllable heat quantities and controllable fuel cell quantities essentially to a target value, and a power imbalance situation can be controlled by said at least one controllable electrical heater to operate as a buffer for excess energy of the fuel cell device.

Exemplary embodiments of the disclosure are based on utilizing the thermal mass of the fuel cell device as energy buffer together with the controllable electrical heater, which is integrated to a control arrangement to be capable of immediately responding to power unbalance conditions. Thermal response time of the fuel cell device is utilized by controlling the at least one controllable electrical heater for acting as a buffer for excess energy during exceptional operating conditions. Exemplary embodiments provided herein are also based on utilization of an advanced control arrangement where at least three controllers operate together to control different kind of controllable quantities essentially to control system heat balance both in normal operation mode and in power imbalance situation and also between state changes from normal operation mode to power imbalance situation and from power imbalance situation to normal operation mode. The control arrangement is arranged to be capable of detecting electrical network changes automatically without delay.

According to an exemplary embodiment of the disclosure, control of fuel cell device operation in exceptional operating conditions can be achieved with normal control parameters without the need for costly additional components and also without the need for state changes or modified parameter sets compared to normal electrical network paralleled operation.

Exemplary embodiments described herein provide an arrangement and related control solution for controlling the temperature balance of a nominally steady-state high temperature fuel cell system, having a capability of balancing the power output of the system to match the need if the system due to, e.g., a grid fault, is intermittently placed in stand-alone operation. The described embodiments are based on utilizing the thermal mass of the of the system as energy buffer, together with electrical heaters arranged to be capable of immediately responding to power unbalance conditions. The thermal mass effectively delays and low-pass filters the effect of changes in heat injected to the system allowing the balance of plant (BoP) control to respond correspondingly at a limited pace whereas fast transients in power need are handled most often solely by changes in heater power.

Exemplary embodiments according to the disclosure are directed to controlling and optimizing system operating conditions both in a normal steady state (grid, i.e., electrical network paralleled) operation mode and in a fault ride through (stand-alone) operation mode, e.g., in exceptional operating conditions, without the need for state changes, parameter changes or special control sequences in relation to a change in said operation premises (paralleling to stand-alone and back).

Also, exemplary embodiments according to the disclosure achieve limited fault ride through capability for a normally grid tied system without specifying costly additional components. The disclosure utilizes the inherent thermal response time of the system to act as a buffer for excess energy during exceptional operating conditions imposed by, for example, a grid fault.

Reference numbers used in the following refer mainly to FIG. 3, though an exemplary embodiment of the disclosure is presented more detailed later on in this description.

Figure 3:
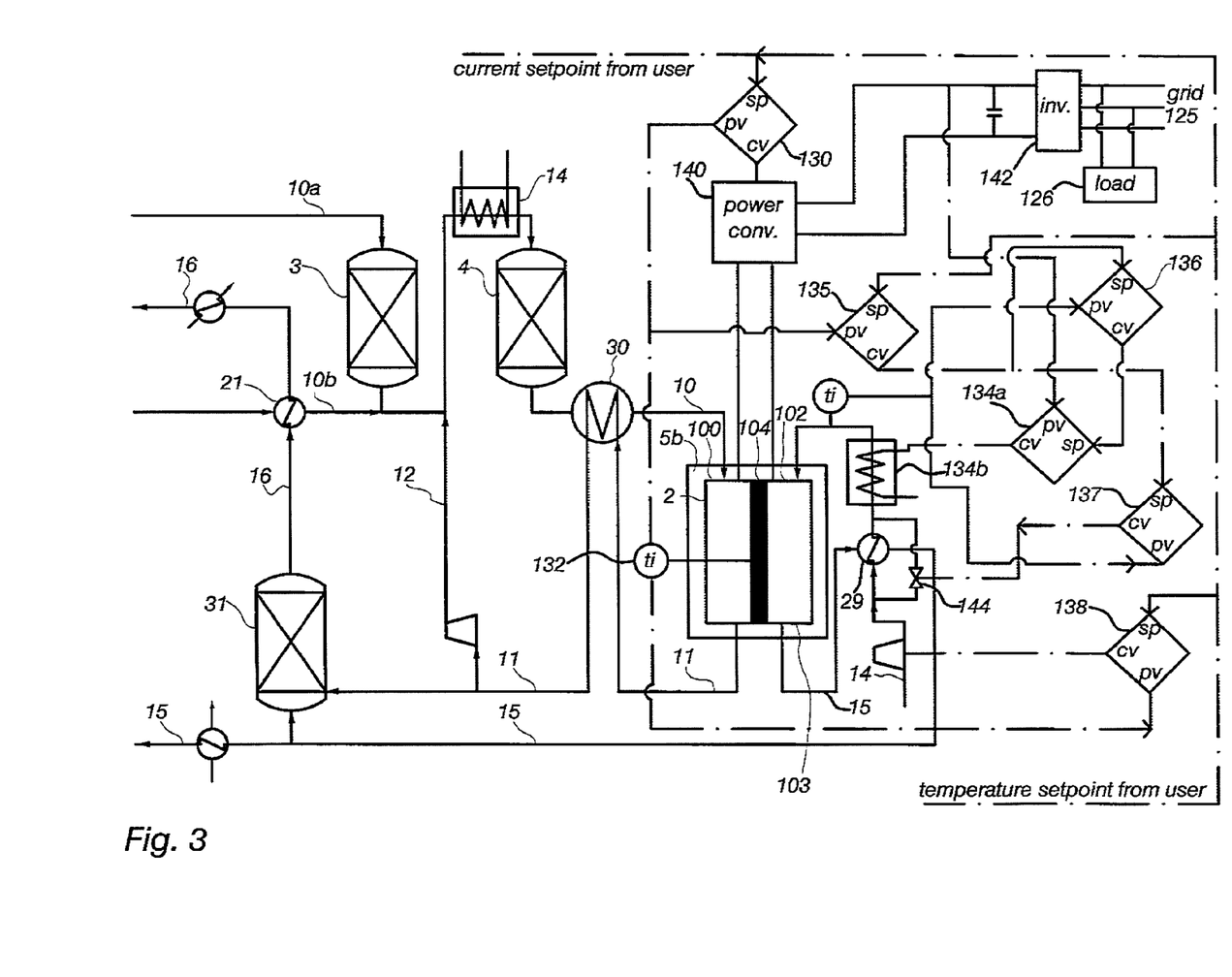
FIG. 3 illustrates an exemplary control arrangement of a fuel cell device in accordance with an exemplary embodiment of the present disclosure.

FIG. 3 illustrates an exemplary control arrangement of a fuel cell device in accordance with an exemplary embodiment of the present disclosure. As shown in FIG. 3, the arrangement includes at least two controllers for controlling the stack temperature, controlling stack inlet temperatures, an amount of air feed and/or rate of internal reforming. The air feed controller 138 controls the temperature of the stacks by providing additional air if needed to cool down the stacks. At least one of the controllable quantities involves the control 134a of at least one significant electrical heater 134b. The said heater(s) 134b is controlled by a high-speed low-level control loop, deriving the heater 134b power based on the power balance of the fuel cell system. In an exemplary embodiment, heater power is derived from DC-link voltage of a DC/AC inverter 142 in the system. Upper level control of the heater(s) 134b is accomplished by providing a set point for the reference voltage such that the resulting heater power matches the need. A third and ultimate mechanism for controlling the stack temperature is implemented in the loading control of the stack such that stack temperatures above nominal will cause a reduction of stack loading.

In the described control arrangement, at a sudden (downward) change in power balance, caused, for example, by a grid outage (island operation), the heater 134b, controlled by the power balance, will peak in power in order to compensate for the change. Since the low-level control loop of the electrical heater is implemented using analogue or autonomous high speed digital control, the power balancing effect will take place without the need of the BoP control logic to react. The heater power being determined by the power balance between stack output and external load rather than by a set point derived by the BoP control represents the loss of one degree of freedom in the control of the thermal conditions of the system. Since the thermal balance of the system can be adjusted also by other means such as air feed, reactor temperatures and stack loading, the balance can still be maintained, although less optimally from efficiency and operating conditions point of view. The decreased efficiency or increased degradation rate caused by the non-optimality is of little significance if the conditions arise only in exceptional situations such as grid 125 outage.

Due to high thermal time constants of the system a change in heater power(s) can have a significantly delayed and low-pass filtered effect on system temperatures. In an exemplary embodiment of the present disclosure, the slow temperature rise can then be compensated for by normal BoP control by increasing air feed and ultimately by the reduction of stack loading upon increased temperatures. As the electrical heating power is directly dependent on the difference between stack output and external load, a reduction of stack output will reduce both internal heat production in the stack and external heating in the electrical heater, thus effectively bringing the system towards a new thermal equilibrium state. Since the thermal time constants of the system can be relatively long (from minutes up to tens of minutes), the above described mechanism for controlling stack loading based on stack temperature will only cause slow transients in the stack loading, which transients are well within the response capability of the whole balance-of-plant (BoP) system. As a result, the BoP control in transient (island-mode) conditions can be handled by means of normal BoP control parameters without a condition of state changes or modified parameter sets as compared to normal grid paralleled operation. Once the system returns to grid paralleled operation the BoP control regains the lost degree(s) of freedom of control (heaters) (134a), allowing the system again to strive towards optimum operating conditions. Hence, the DC/AC inverter 142 should implement special control for island and grid paralleled operation related operating mode transitions. The method can also be utilized without an island-mode capable DC/AC inverter if all system internal and possible external loads can be supplied from system internal DC-voltage.

The capability of the system to react to load changes is determined by the dimensioning and duty rate of the heater(s) 134b. The power being applied to the heaters at a time instant represents the largest allowable upward step in load that the system can respond to, whereas the "unused" heating capacity in the heaters corresponds to the largest downward step in load that the system can handle without causing a sudden reduction of stack currents. In an exemplary embodiment, even larger downward steps in load can be accepted at the moment of transition to island mode operation if the stack and the BoP can handle a sudden reduction in stack loading. The transient response margins, e.g., electrical heating power, can be optimized by adjusting the stack air feed and/or other mechanisms affecting system heat balance, such as external water feed, anode circulation or reactor temperatures, such that a desired heater duty is reached, e.g. 20-50%, depending on the external load. The ability to modulate system heat balance can be significantly increased by adding bypasses over heat exchangers allowing reduction of heat exchange rates.

In the exemplary embodiment shown in FIG. 3 of the disclosure, an electrical channel heater 134b is arranged to heat the cathode inlet stream after a recuperating air-air heat exchanger 29 to facilitate heat-up of the system and power balance adjustment. A controllable cold air bypass streamer 144 is arranged over the inlet side of the said heat exchanger to allow for lowering the temperature of the cathode 102 inlet stream to compensate for heating as well as for providing margin for increased heat production in stacks at end of life conditions. The controlling of said cold air bypass streamer 144 is performed by controller 137. An upper level temperature controller 135 requests a feed-in temperature to the stacks 103 and provides control value information to the controller 137.

The heater 134b is controlled by a solid-state switch device in pulse width modulation (PWM), where the modulation ratio is proportional to a difference between measured value and provided set point of the DC/AC inverter 142 DC-link voltage. The heater 134b is operated with DC from the DC-link or fuel cell DC voltage to allow for fast PWM control. The upper level control of the heater 134b power is handled by a stack inlet temperature controller 136 controlling stack temperatures by adjusting the cathode 102 inlet temperature within allowable bounds by providing the said DC-link voltage set point to the heater 134b. In normal grid 125 paralleled operation the DC/AC inverter 142 will maintain the DC-link voltage at a constant level whereby the heater power is solely determined by the control output of the upper level controller. In case of a grid failure, the DC/AC inverter loses its capability to stabilize the DC-link voltage whereby excess energy from the system will cause the DC-link voltage to rise which is counteracted by the low level electrical heater controller 134a by consuming the excess energy in the heater 134b.

The exemplary embodiment of FIG. 3 also includes an air feed controller 138 controlling the stack temperatures in cooperation with the described stack inlet temperature controller 136 such that air feed is increased from its minimum value if the stack inlet temperature controller 136 is not capable of preventing stack temperature rise.

Further, the exemplary fuel cell device includes a loading controller 130 ramping stack current towards a defined optimum point, however reducing currents if both the stack inlet temperature controller 136 and air feed controller 138 fail to limit the temperature rise of stacks. The proper priority and interaction of the three controllers 134a, 136, 138 all controlling the same quantity, e.g., stack temperatures can be accomplished using slightly offset set points for the different controllers in combination with properly tuned proportional and integrating action of each of the controllers.

As shown in FIG. 3, a fuel cell device includes a fuel cell unit 103 having one or more fuel cell stacks having successively series-connected fuel cells 103, featuring an anode side 100, a cathode side 102 and an electrolyte 104 provided there between, as well as a connecting plate, a so-called interconnect, set between individual fuel cells (not shown). For the sake of clarity, in FIG. 3 is only shown one fuel cell stack in the form of a single fuel cell 103. It should be understood, however, that the number of fuel cell stacks is not limited to a certain value, such that numerous (e.g., any combination) or even a single stack can be used.

In FIG. 3, the anode side 100 refers generally both to anode electrodes included in the fuel cells 103 of the fuel cell units 103 and, from the perspective of fuel, to components for conducting the fuel within the confines of the fuel cell units 103 to the anodes of actual individual fuel cells and to components for further conducting the gases away from the anodes 100. Respectively, the cathode side 102 refers to cathode electrodes, as well as to components provided for conducting air to and from the cathodes within the confines of the fuel cell units 103.

In addition, for feeding fuel gas to the anode side 100, the anode side is provided with supply means, represented here solely by a supply line 10. In FIG. 3, the fuel enters the fuel cell device through line 10a and goes here first into a desulphurizer 3. Together with possible recycled fuel in line 12 as wells as steam coming from line 10b, the formed flow enters next a prereformer 4, fuel pretreatment device, or other suitable component as desired.

The fuel cell units also include means for discharging the fuel cell unit of used fuel gas outgoing from the anode side 7. The means for discharging the fuel cell unit can include a discharge line, such as discharge line 11. Naturally, there can be a plurality of lines such as 10, 11. The exit flow 11 is then guided via heat exchanger means 30 to heat up the entering supply fuel in line 10. Part of the fuel is recycled through line 12 while the rest is led to an afterburner 31. The heat thereof is used among others on producing steam in unit 21 which is directed into line 10b to be used in the prereformer 4.

On the cathode side 102 air is supplied through line 14, which is then divided to be delivered to fuel cell stacks 103 and further to individual fuel cells 2. Correspondingly, the air coming from the fuel cells 2 composing thereby an exit flow 15 exits the fuel stack compartment and is guided thereafter to flow via a recuperator unit 29 to heat up the supply air flow 14. Also, here all the piping is presented just by a single line for the sake of clarity.

FIG. 3 illustrates an exemplary control arrangement for controlling operating conditions of a fuel cell device, which is parallel connected to electrical network 125 for producing electrical current to electrical network. The fuel cell device includes a load 126 for fuel cells 103, and a controller 130 for said load for fuel cells.

The exemplary control arrangement includes means 132 for determining essential temperature information of the fuel cells 103. The means 132 is used as a temperature measurement device, which is capable of measuring many hundred Celsius degrees temperatures, for example 100-1000 Celsius degrees temperatures. Temperature information can also be obtained through a calculative process, for example, in a control computer (e.g., processor) or in some other processor by utilizing, and through temperature measurement information from fuel device process flows and other essential information related to fuel cell stack conditions, such as, for example, composition, loading and utilization rate information. The control arrangement includes the controller 130 for controlling stack loading, said controller being capable of performing load reduction if said essential temperature information exceeds a limit value.

In an exemplary embodiment of the present disclosure, PID (Proportional-Integral-Derivative) controllers 130, 134a, 135, 136, 137, 138 or other types of known feedback controllers (e.g., processors) can be used to perform different kinds of control tasks. Letter symbol "sp" designates a setpoint provided to the controller (e.g., stored in memory) and "pv" designates a process value to the controller. These are both input values to the controllers 130, 134a, 135, 136, 137, 138 from the control process of the fuel cell device. Letter symbol "cv" designates a control value of the controller. Control values (cv) are output values from the controllers 130, 134a, 135, 136, 137, 138 to the control process of the fuel cell device.

In the exemplary control arrangement at least one controllable electrical heater 134b for operating as a device producing heat quantities as controllable heat quantities both in normal operation conditions and in power imbalance situations is used. In the preferred embodiment the at least one controllable electrical heater 134b can be controlled by the low level high speed controller 134a by deriving the heater 134b power based on the power balance of the fuel cell device. In an exemplary embodiment, the controller 134a utilizes pulse width modulation (PWM) in the control of the electrical heater 134b. The control arrangement as provided herein utilizes at least two of the controllers 134a, 135, 136, 137, 138 for controlling as controllable fuel cell quantities, at least an amount (e.g., portion) of air flow to the fuel cells 103, and uses heat applied to the fuel cell stack environment for controlling at least one of the controllable heat quantities and controllable fuel cell quantities to a target value. In an exemplary embodiment (FIG. 3) said controlled amount of air flow to fuel cells 103 means amount of air flow to the cathode sides 102 of the fuel cells 103. Temperature set point information and current set point information, both set by the user of the control arrangement, are utilized in controlling of at least one of the controllable quantities to said target value. Also a controllable quantity can be utilized as at least one of the following quantities: inlet air temperature to the fuel cells 103, and rate value of internal reforming in the fuel cell device.

When a malfunction exists in electrical network, the control arrangement according to exemplary embodiments of the disclosure is capable of automatically and immediately noticing power imbalance situation in the system by the low level high speed controller 134a, which follows the level of output voltage of the fuel cell device. In power imbalance situation the low level high speed controller 134a is utilized to operate the at least one electrical heater 134b as a buffer for excess energy of the fuel cell device. The low level high speed controller 134a can be implemented as a P (proportional) type controller, which is a special type of the PID controllers (proportional-integral-derivative controller) (e.g., processor) capable of providing rapid (for example about a millisecond) control value response to changes in the process value. The malfunction of electrical network can vary depending on duration of very short-term (e.g., voltage spike), for long-term (blackouts). When malfunction has dismissed from electrical network, the control arrangement can be capable of automatically and immediately detecting the new situation for example by following voltage changes in the electrical network 125, and the operation of the fuel cell device is returned as fast as possible to the normal situation where for example the stack inlet temperature controller 136 returns to control power of the controllable heater 134b and where the fuel cell device feeds current to electrical network 125. Exemplary embodiments of the disclosure can thus also be appointed as an automatic network interactive electrical power balancer for fuel cell device applications connectable to different kind of electrical networks. In the context of the present disclosure, electrical networks can therefore be a single-phase, two-phase, three-phase, and so on, and alternating current network and also DC power networks can be relevant.

Embodiments according to the disclosure can be utilized in different kinds of fuel cell devices. In the exemplary embodiments of the present disclosure, electrical network can be the common electrical power distribution network and DC electricity produced by the fuel cell device can be fed to the network, for example, through a three phase DC-AC transform. Exemplary embodiments according to the disclosure can be realized through many kinds of electrical network applications, and thus, for example, a DC-AC transform is not needed in every application.

Further, exemplary embodiments of the present disclosure can be implemented by at least one PID controller, processor, and/or suitable computer processing device as desired, which is specially programmed and/or configured to execute a process recorded on a non-transitory computer-readable recording medium, such a s a hard disk drive, flash memory, optical memory or any other type of non-volatile memory as desired.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A control arrangement for controlling operating conditions of a fuel cell device that produces electricity with fuel cells, each fuel cell in the fuel cell device having an anode side, a cathode side, and an electrolyte between the anode side and the cathode side; the fuel cells are arranged to be in stack formation, and the fuel cell device includes a load for the fuel cells, a controller for said load for fuel cells, and a temperature measurement device for determining temperature information of the fuel cells, the fuel cell device being configured to be parallel connected to an electrical network for providing electrical current to the electrical network, the control arrangement comprising:

at least one controllable electrical heater configured to produce controllable heat quantities both in normal operation conditions and in power imbalance situations;

at least two controllers that control as controllable fuel cell quantities, at least a portion of air flowing to the fuel cells and heat applied to the stack formation, wherein at least one of the controllable heat quantities and controllable fuel cell quantities are controlled to meet a target value;

a processor configured to provide proportional type control of said at least one controllable electrical heater during a power imbalance by deriving heater power based on a power balance of the fuel cell device to operate said heater as a buffer for excess energy of the fuel cell device;

a solid-state switch device configured to control the at least one controllable electrical heater using pulse width modulation (PWM); and wherein the at least one controllable electrical heater is connected to a DC bus and the processor is configured to control the at least one controllable electrical heater in a power imbalance based on a voltage of the DC bus.

2. The control arrangement in accordance with claim 1, wherein the control arrangement is configured to control as a function of temperature set point information during operation of at least one of the two controllers.

3. The control arrangement in accordance with claim 1, wherein the control arrangement is configured to control as a function of current set point information during operation of at least one of the two controllers.

4. The control arrangement in accordance with claim 1, wherein the controllable fuel cell quantities includes at least one of: inlet air temperature to the fuel cells, and rate value of internal reforming in the fuel cell device.

5. The control arrangement in accordance with claim 1, comprising:

a controller configured to control stack loading of said fuel cells and perform load reduction of said fuel cells if said temperature information exceeds a limit value.

6. The control arrangement in accordance with claim 1, wherein the at least one controllable electrical heater is connected to a DC bus and the processor is configured to control the at least one controllable electrical heater in a power imbalance based on a voltage of the DC bus on a millisecond time scale.

* * * * *